United States Patent [19]
Ferguson

[11] 3,844,202
[45] Oct. 29, 1974

[54] ENCLOSED CAB TYPE LAND VEHICLE AIR TREATMENT SYSTEM

[75] Inventor: J. C. Ferguson, Davison, Mich.

[73] Assignee: Alton E. Sherwin, East Tawas, Mich. ; a part interest

[22] Filed: July 20, 1973

[21] Appl. No.: 381,362

[52] U.S. Cl........................ 98/2.11, 98/2.14, 98/13, 123/198, 114/16, 62/244, 180/54
[51] Int. Cl............................................. B60h 1/24
[58] Field of Search ............ 98/2.11, 2.00, 2.14, 8, 98/10, 13, 14, 64; 123/198 P; 61/69 R; 114/16 D, 16 B; 62/244; 180/54 A

[56] References Cited
UNITED STATES PATENTS

| | | | |
|---|---|---|---|
| 388,257 | 8/1888 | Brown | 114/16 B |
| 663,173 | 12/1900 | Hoy | 98/64 |
| 2,182,716 | 12/1939 | Brent | 98/8 |
| 2,232,108 | 2/1941 | Gizcomini | 98/2.14 |
| 2,429,732 | 10/1947 | Roos | 123/198 P |
| 2,700,927 | 1/1955 | Jordan | 98/2.11 |
| 3,657,992 | 4/1972 | Minnick | 98/2.11 |

Primary Examiner—Meyer Perlin
Attorney, Agent, or Firm—William L. Fisher, Esq.

[57] ABSTRACT

Enclosed cab type land vehicle air treatment system comprising a first part constructed to be mounted upon stationary structure of said vehicle and a second part pivotally swingably mounted upon said first part so that said second part can be swung by obstacles struck by said second part during operation and movement of said vehicle, said second part being swung rearwardly and downwardly to automatically clear such obstacles, said second part comprising air intake stack means upstanding from said cab so as to be capable of taking in fresh air above a dust zone in which said vehicle operates moves, and air conduit means connecting the lower end of said stack means to an air-utilizing chamber of said vehicle for supplying said chamber with air taken in by said stack means.

16 Claims, 6 Drawing Figures

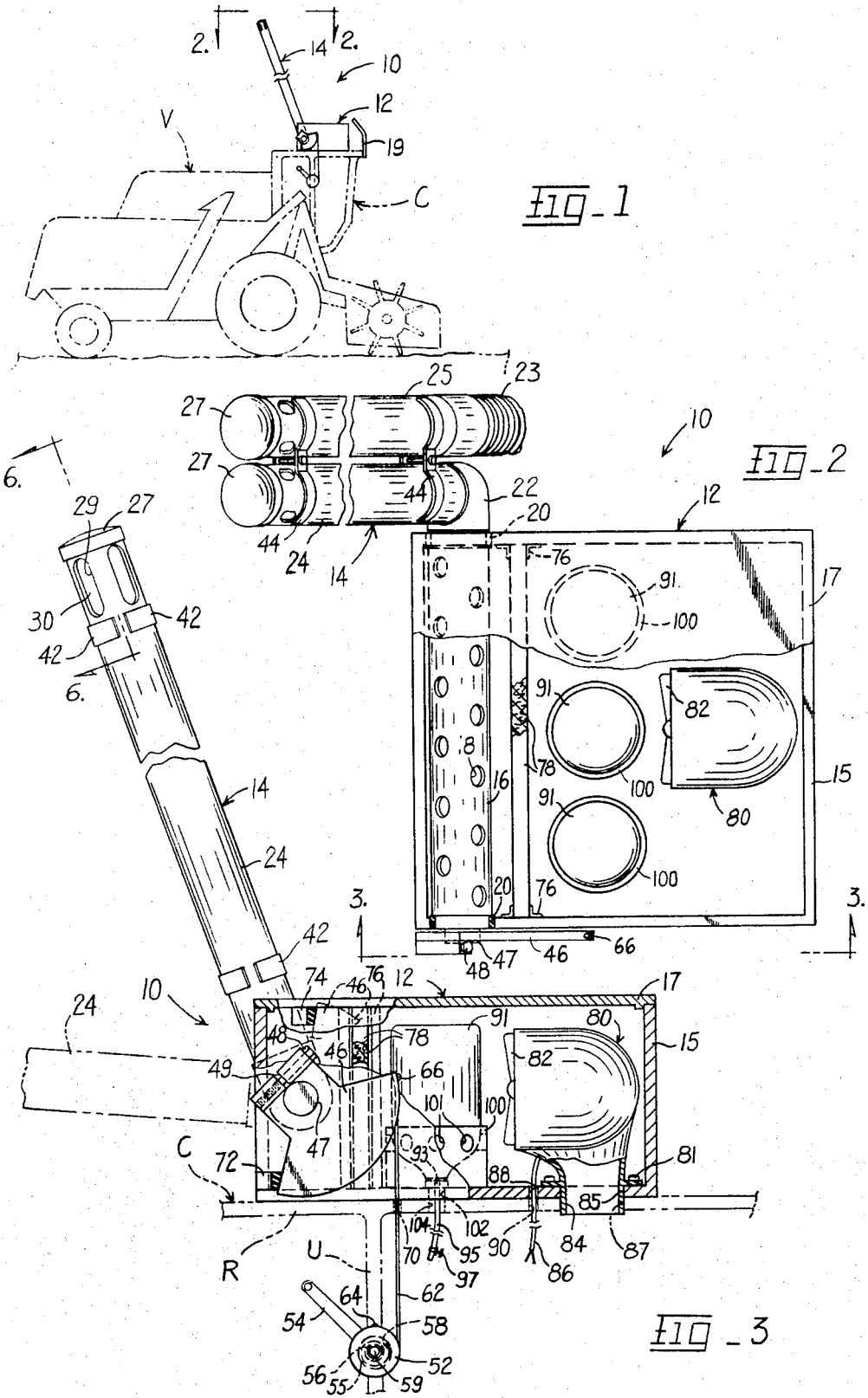

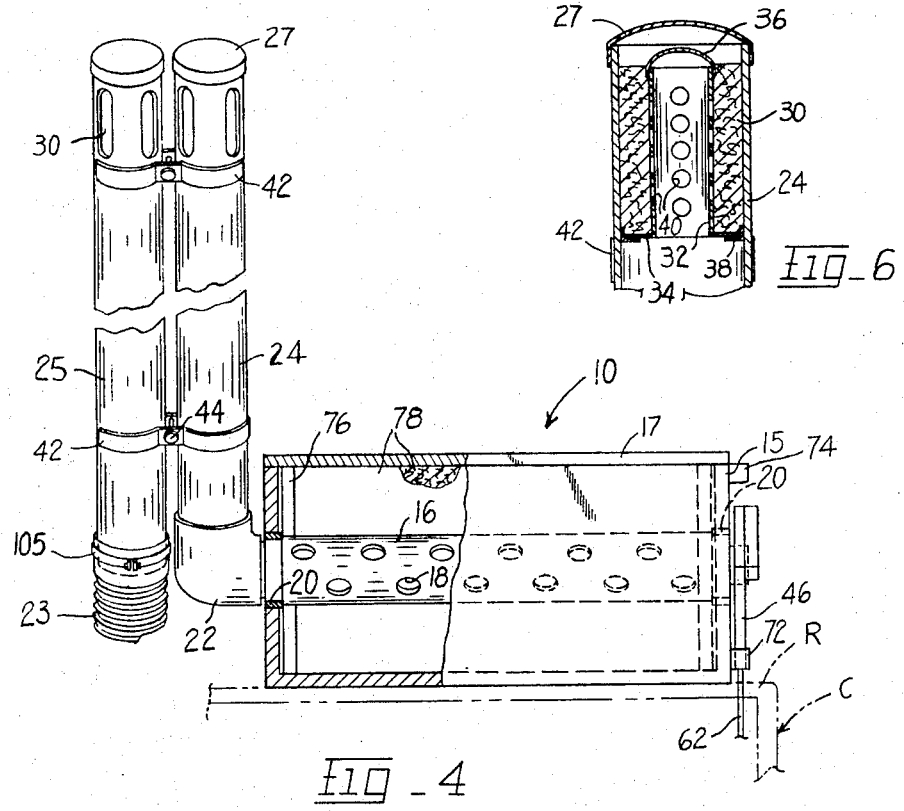
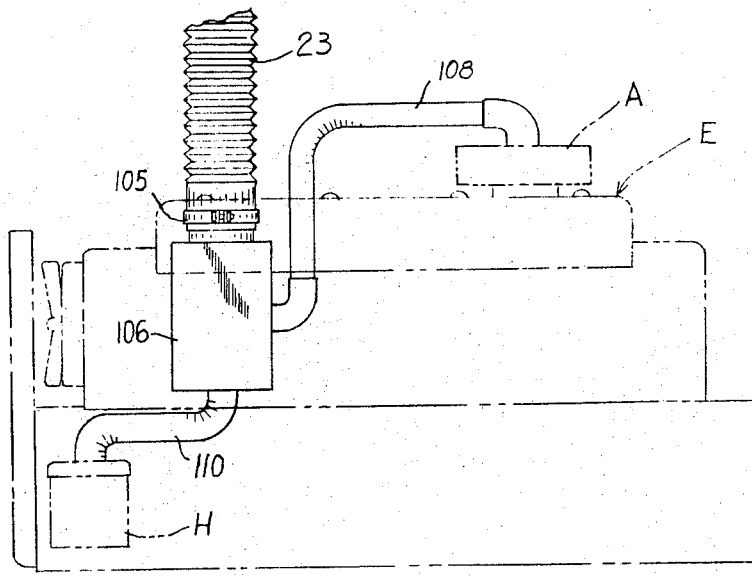

ENCLOSED CAB TYPE LAND VEHICLE AIR TREATMENT SYSTEM

My invention relates to enclosed cab type vehicles, particularly crop harvesting agricultural vehicles.

It is known that many, if not all, such vehicles operate in very bad dust conditions which are injurious to the health of the operators thereof. It has generally been the thinking of manufacturers and users of said vehicles that providing the operator thereof with an enclosed cab was sufficient health protection for him. Unfortunately, I have found out through personal health damaging experience that this is far from the truth. I suffer from emphysema caused by operating enclosed cab type agricultural crop harvesting vehicles over a period of years and wish to prevent countless other such operators from having to endure the same hardships and sufferings I have had to endure from dust caused lung disease. Such is the object of my invention which is accomplished by my providing an enclosed cab type vehicle air treatment system which is extremely beneficial, if not absolutely essential, to the health and safety of operators of such vehicles and at the same time is very helpful to the proper functioning and maintenance of the engine and hydraulic system of the vehicle.

The foregoing object of my invention and the advantages thereof will become apparent during the course of the following description, taken in conjunction with the accompanying drawings, in which:

FIG. 1 is a perspective view of an enclosed cab type vehicle equipped with an air treatment system embodying my invention;

FIGS. 2–5 are, respectively, top plan, side and end elevational views of parts of said embodiment and FIG. 6 is a fragmentary vertical sectional view of the structure of FIG. 3 taken on the line 6—6 thereof.

Referring to the drawings in greater detail, V generally designates a typical self-propelled crop harvesting vehicle having an operator's cab C, an internal combustion engine E with a carburetor A therefor and a hydraulic system for operating the various crop harvesting implements carried on said vehicle V. Said hydraulic system includes a hydraulic pump (not shown) driven by said engine E and a hydraulic reservoir H. Said embodiment of my invention is generally designated 10 and comprises a part 12 thereof including a housing 15 mounted upon the roof R of said cab C and a part 14 thereof pivotally mounted upon said part 12. Said housing 15 is made fast to the roof R by any suitable means and has a removable cover 17. Said part 14 comprises a pair of air intake stacks 24 and 25 which are fastened together by sets of longitudinally spaced apart brackets 42 and fasteners 44 so that they swing together as a unit. The stack 24 is joined, via an elbow 22, to a pipe 16 disposed in said housing 15 and having aperture means 18 in the wall thereof for conveying air from the stack 24 to the interior of said housing 15. Said pipe 16 is journeled, via bearings 20, in the side walls of said housing 15 and has a pulley segment 46 fastened to the end thereof opposite said elbow 22 for purposes which will appear. In the instance, a turned down stub shaft 47 is fastened in said end of said pipe 16 for holding said pulley segment 46 which is slotted, as at 49, so that it can be clamped, as by the bolt 48, to said shaft 47. Each said stack has a rain shed lid 27 on the upper end thereof and is provided in the immediate vicinity of said lid 27 with aperture means 29 therein for taking in fresh air to the interior thereof. Such air entering each said stack is filtered by suitable air filter media 30 wrapped around a tube 32 having apertures 40 therein. Fastened to the lower end of said tube 32 is an annular ring 34 which rests upon circumferentially spaced apart mounting brackets 38 suitably fastened in the interior of the respective stack. A strap handle 36 is fastened to the upper end of each said tube 32 for removing the respective filter media 30 to change the same.

Inside the cab C a pulley 52 having a handle 54 is arranged within convenient reach of the vehicle operator and rotatably mounted upon an axle 59 made fast to an upright U which is an existing structural part of said cab C. A cable 62 which extends through a clearance hole 70 in said cab C is wrapped around the pulley 52 and has its opposite ends 64 and 66 fastened to said pulley 52 and to the pulley segment 46, respectively. The diameter of the pulley segment 46 is sufficiently greater than that of the pulley 52 to provide a mechanical advantages means for the vehicle operator to assist him in manually uprighting said stacks 24 and 25 after they have been lowered from striking an obstacle. A coiled flat spring 55 has its opposite ends 58 and 60 fastened to the pulley 52 and to the axle 59, respectively, for keeping tension on the cable 62. In keeping tension on the cable 62. In keeping tension on the cable 62, said spring 55 acts as a counterbalance means for the stacks 24 and 25 slowing down their fall when they strike an obstacle and assisting in the manual raising of the stacks 24 and 25 after they have been lowered from striking an obstacle. Rubber covered stops 72 and 74 mounted upon the housing 15 cushion the pulley segment 46 in its final movements.

In the housing 15 an air blower 80 is fastened, as at 81, to the floor thereof and has a suction fan blade 82 facing the pipe 16 and its outlet duct 84 sealed in aligned apertures 85 and 87 in said housing 15 and roof R, respectively, so that said blower 80 sucks air from the stack 24 through the pipe 16 and exhausts pressurized air into the cab C thereby maintaining said cab C slightly above atmospheric pressure so that fresh air exits through any cracks, crevices, or other openings in the walls of the cab C so as to keep out all dust. The power cord 86 for the electric motor driving said blower 80 extends through aligned apertures 88 and 90 in said housing 15 and roof R, respectively, for reaching a suitable electrical power source on said vehicle V. The air that is drawn from the stack 24 and through the pipe 16 by said blower 80 travels through a second air filter 78 mounted crosswise inside said housing 15 by suitable brackets 76 and also travels around filled bottles 91 which are held inside of said housing 15 in inverted position by respective holding means 100 which are provided with apertures 101 for air circulation. The cap 93 of each bottle 91 is fitted with a length of flexible tubing 95 which extends through a clearance hole formed by aligned apertures 102 and 104 in said housing 15 and roof R, respectively, and into said cab C so that the free end thereof is within convenient reach of the operator so that he can dispense the contents of said bottle 91. A manually operative valve 97 is provided on said free end of said tubing 95 for pinching off or opening the same as desired by said operator.

The stack 25 supplies the engine E with clean air and for this purpose is fitted on its lower end with a flexible pipe 23 which connects, via suitable means 105, to the inlet of a Tee connector 106, one outlet of which is connected, via a flexible pipe 108 to said carburetor A by suitable means (not shown) so that said pipe 108 serves as the exclusive air intake for said carburetor A. Likewise, by means of the pipe 110 the other outlet of said Tee connector 106 serves as the sole air breather means for said hydraulic reservoir H. The direction of air movement is both ways in respect to the hydraulic reservoir H and said flexible pipe 110 replaces the conventional breather cap for said reservoir H. In the case of the carburetor A the air movement is one way into the carburetor A and the pipe 108 is connected to the carburetor A without replacing the conventional air filter therefor (whether it be of the dry treated paper or oil bath type), i.e., the pipe 108 is connected ahead of or upstream in respect to said conventional carburetor air filter.

Once my vehicle air treatment system is installed and operating on an enclosed cab type vehicle the stacks 24 and 25 are able to reach up high above the ground (e.g., 18 or 19 feet) so to draw in fresh air above any created dust zone which air, via the stack 25, is used to supply the carburetor A and hydraulic reservoir H so as to keep down maintenance and repair bills on said engine E. The air filter for the carburetor A does not have to be serviced nowhere near as often as when any such vehicle V is operating without my system as in such latter case such air filter must be serviced daily. At the beginning of any working day the operator inserts into the holders 100 one or more of the bottles 91 filled with drinking liquid such as water, lemonade, tea or the like which he first well iced or froze the night before. The air which is drawn to the blower 80 circulates around said bottles 91 and causes their contents to melt so as to provide a supply of drinking liquid for the operator and at the same time such air itself becomes chilled or refrigerated from the heat which it gives up in melting said contents. In this way the clean slightly pressurized air which always fills the cab C is refrigerated for the operator's maximum comfort to enable him to do his best work. The stacks 24 and 25 are disposed at a slight backward tilt in respect to the vertical so as to decrease their inertia to moving in the event of being struck by any obstacle which the vehicle V may confront during operation thereof. I provide said vehicle V with a pair of transversely spaced apart spring steel deflectors 19 which I mount on top of said cab C in front of said housing 15. Any such obstacle at the height of the cab C will be diverted by the deflectors 19 away from the housing 15 and will be moved thereabove so as to strike the stacks 24 and 25 instead. Striking of the stacks 24 and 25 by an obstacle causes them to move rearwardly and downwardly until they pass beneath the obstacle. The stacks 24 and 25 are capable of swinging below said housing 15 in their extreme deflected position. Movement of the stacks 24 and 25 will be signaled to the operator in the cab C by virtue of the rotation of the pulley 52 so that the operator can manually return the stacks 24 and 25 to their upright position by rotating the handle 54. To stabilize the stacks 24 and 25 in their upright position I provide yieldable means (not shown) mounted upon stationary structure in the cab C and operative upon the handle 54 to yieldably hold it in the position shown. Such yieldable means may be in the form of a flexible pole, e.g., a length of fishrod, which will hold the stacks 24 and 25 against movement during ordinary jarring of the vehicle or striking of said stacks 24 and 25 by small obstacles of doing damage to the stacks 24 and 25 but which will bend and thus move aside out of the way of the handle 54 to allow it to rotate in the event said stacks 24 and 25 strike larger obstacles otherwise capable of damaging them. At the time the operator manually re-sets the stacks 24 and 25 to their upright position he also manually re-sets said yieldable means against the handle 54 to again stabilize the stacks 24 and 25 in their upright position.

It will thus be seen that there has been provided by my invention an enclosed cab type vehicle air treatment system in which the object hereinabove set forth, together with many thoroughly practical advantages, has been successfully achieved. While a preferred embodiment of my invention has been shown and described, it is to be understood that variations and changes may be resorted to without departing from the spirit of my invention as defined by the appended claims. For example, the stack means 24 and 25 can be made of non-conductive plastic material so as to decrease the possibility of being an attraction for lightning. Similarly the housing 15 and cover 17 therefor can be made of non-conductive plastic material and the brackets 42 and fasteners 44 therefor. In fact all parts can be made of plastic with the exception of the air prime mover means 80.

What I claimed is:

1. Enclosed cab type land vehicle air treatment system comprising a first part constructed to be mounted upon stationary structure of said vehicle and a second part pivotally and swingably mounted upon said first part so that said second part can be swung by obstacles struck by said second part during operation and movement of said vehicle, said second part being swung rearwardly and downwardly to automatically clear such obstacles, said second part comprising air intake stack means upstanding from said cab so as to be capable of taking in fresh air above a dust zone in which said vehicle operates and moves, and air conduit means connecting the lower end of said stack means to an air-utilizing chamber of said vehicle for supplying said chamber with air taken in by said stack means.

2. Means as claimed in claim 1, said first part mounted on the top of said cab, deflector means operative above said cab ahead of said first part to deflect said obstacles away from said first part into the path of travel of said stack means to cause it to swing and clear such obstacles.

3. Means as claimed in claim 1 further comprising means normally holding said stack means at a slight rearward tilt in respect to the vertical so as to decrease its inertia to swinging when struck by obstacles.

4. Means as claimed in claim 1 further comprising manually operative means in said cab within reach of the vehicle operator for uprighting said stack means after it has been lowered by an obstacle.

5. Means as claimed in claim 4, said manually operative means further comprising mechanical advantage means for assisting the cab operator in uprighting said stack means after they have been lowered from striking an obstacle.

6. Means as claimed in claim 4, counterbalancing means for said stack means slowing down its fall when it strikes an obstacle and assisting in the manual raising of said stack means after it has been lowered from striking an obstacle.

7. Means as claimed in claim 1, air treatment means for treating the air taken in by said stack means including at least air filter means for filtering said air, said air-utilizing chamber being the operator cab of said vehicle for supplying said filtered air to said cab.

8. Means as claimed in claim 7, air prime mover means for drawing air into said stack means under suction.

9. Means as claimed in claim 8, said first part constructed so that the interior thereof is a relatively airtight chamber, air passage means connecting the interior of said first part to the interior of said cab so that the latter is supplied with air which passes through said first part, said air prime mover means disposed in the interior of said first part so that it exhausts air into said cab under pressure slightly greater than atmospheric pressure.

10. Enclosed cab type land vehicle air treatment system comprising a first part constructed to be mounted upon stationary structure of said vehicle and a second part pivotally and swingably mounted upon said first part so that said second part can be swung by obstacles struck by said second part during operation and movement of said vehicle, said second part being swung rearwardly and downwardly to automatically clear such obstacles, said second part comprising air intake stack means upstanding from said cab so as to be capable of taking in fresh air above a dust zone in which said vehicle operates and moves, and air conduit means connecting the lower end of said stack means to an air-utilizing chamber of said vehicle for supplying said chamber with air taken in by said stack means, air filter means for filtering the air taken in by said stack means, said air-utilizing chamber being one associated with the engine of said vehicle for supplying air to said engine.

11. Means as claimed in claim 10, said air-utilizing chamber being the carburetor of said engine for supplying said filtered air to said carburetor.

12. Means as claimed in claim 10, said air-utilizing chamber being the hydraulic reservoir of the hydraulic system of said vehicle for supplying said filtered air to said hydraulic reservoir.

13. Enclosed cab type land vehicle air treatment system comprising a first part constructed to be mounted upon stationary structure of said vehicle and a second part pivotally and swingably mounted upon said first part so that said second part can be swung by obstacles struck by said second part during operation and movement of said vehicle, said second part being swung rearwardly and downwardly to automatically clear such obstacles, said second part comprising air intake stack means upstanding from said cab so as to be capable of taking in fresh air above a dust zone in which said vehicle operates and moves, and air conduit means connecting the lower end of said stack means to an air-utilizing chamber of said vehicle for supplying said chamber with air taken in by said stack means, air filter means for filtering the air taken in by said stacks, said air-utilizing chamber being the operator cab of said vehicle for supplying said filtered air to said cab, said air treatment means including air cooling means operative in the interior of said first part for cooling the air which passes through said first part into said cab.

14. Means as claimed in claim 13, said air cooling means comprising plural bottles filled with frozen contents for extracting heat from the air passing through said first part into said cab, said frozen contents producing drinking liquid when melted, whereby to melt the contents of said bottles as and for a supply of drinking liquid for the vehicle operator.

15. Means as claimed in claim 14, means for conveying said drinking liquid into the interior of said cab within reach of the vehicle operator so that he can dispense the same as he desires.

16. Enclosed cab type land vehicle air treatment system comprising a first part constructed to be mounted upon stationary structure of said vehicle and a second part pivotally and swingably mounted upon said first part so that said second part can be swung by obstacles struck by said second part during operation and movement of said vehicle, said second part being swung rearwardly and downwardly to automatically clear such obstacles, said second part comprising air intake stack means upstanding from said cab so as to be capable of taking in fresh air above a dust zone in which said vehicle operates and moves, air conduit means connecting the lower end of said stack means to an air-utilizing chamber of said vehicle for supplying said chamber with air taken in by said stack means, said stack means comprising two separate air intake stacks, one of said stacks pivotally mounted upon said first part, the other stack fast to said first stack so that the two stacks swing together as a unit, said air conduit means connecting the lower end of said one stack with the interior of said cab for supplying said cab with air taken in by said one stack, said air conduit means also connecting the lower end of said other stack with an air-utilizing chamber associated with the engine of said vehicle.

* * * * *

UNITED STATES PATENT OFFICE
CERTIFICATE OF CORRECTION

Patent No. 3,844,202           Dated October 29, 1974

Inventor(s)  J. C. Ferguson

It is certified that error appears in the above-identified patent and that said Letters Patent are hereby corrected as shown below:

Abstract line 4, between "pivotally" and "swingably" insert -- and --; line 12, between "operates" and "moves" insert -- and --. Column 2, lines 27 and 28, cancel "In keeping tension on the cable 62.".

Signed and sealed this 31st day of December 1974.

(SEAL)
Attest:

McCOY M. GIBSON JR.              C. MARSHALL DANN
Attesting Officer                Commissioner of Patents